Dec. 23, 1958 H. E. FROEHLICH 2,865,581
BALLOON GONDOLA ASSEMBLY
Filed April 16, 1956 3 Sheets-Sheet 1
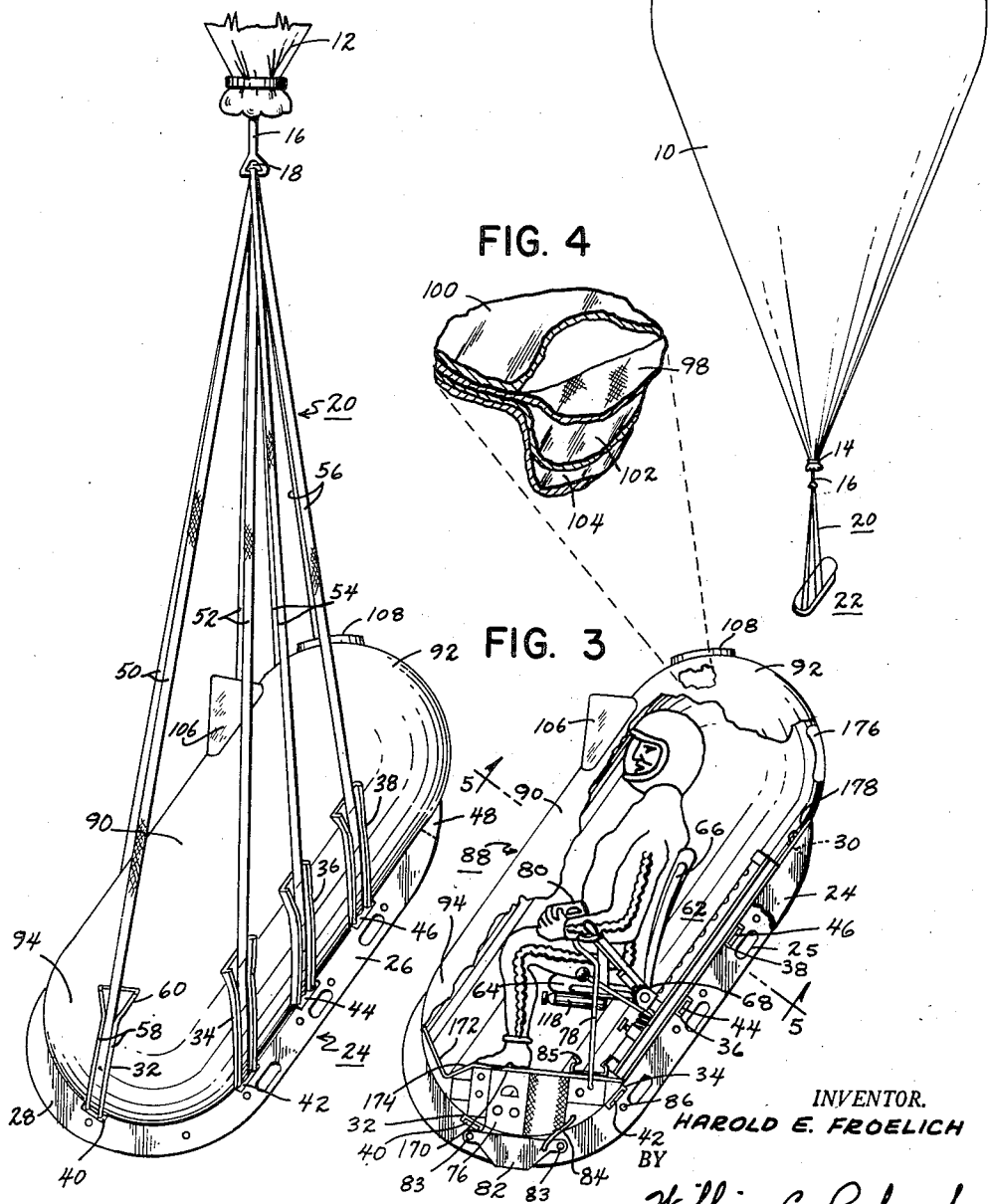
INVENTOR.
HAROLD E. FROELICH
BY
William C. Babcock
ATTORNEY Dec. 23, 1958   H. E. FROEHLICH   2,865,581
BALLOON GONDOLA ASSEMBLY
Filed April 16, 1956   3 Sheets-Sheet 2

INVENTOR.
HAROLD E. FROELICH
BY
William C. Babcock
ATTORNEY

Dec. 23, 1958     H. E. FROEHLICH     2,865,581
BALLOON GONDOLA ASSEMBLY
Filed April 16, 1956     3 Sheets-Sheet 3
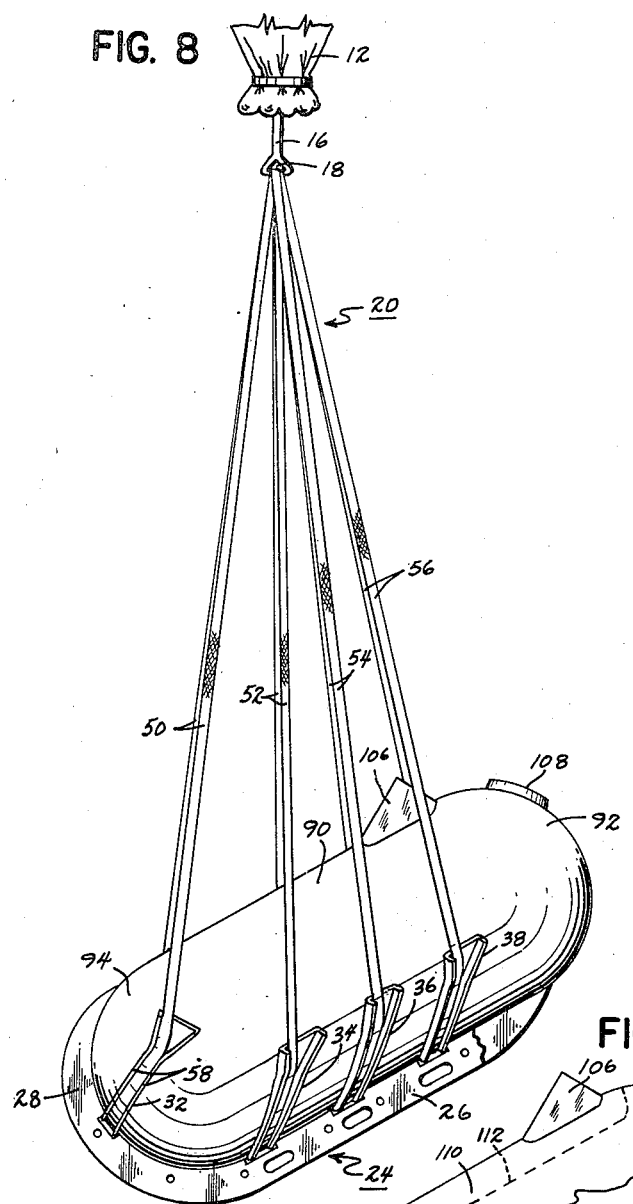
INVENTOR.
HAROLD E. FROELICH
BY
William C. Babcock
ATTORNEY

United States Patent Office 2,865,581
Patented Dec. 23, 1958

2,865,581

BALLOON GONDOLA ASSEMBLY

Harold E. Froehlich, New Brighton, Minn., assignor to General Mills, Inc., a corporation of Delaware Application April 16, 1956, Serial No. 578,530

5 Claims. (Cl. 244—127)

The present invention relates to balloons and more particularly to an improved balloon gondola assembly for high altitude manned flights.

In the balloon field there has been considerable activity in recent years in connection with upper atmosphere research. These high altitude flights have been essentially limited to the transportation of animals and instruments. As far as I am aware, the possibility of successful manned flights at higher altitudes has been severely limited by a number of factors. One of these factors is the problem of operator fatigue. Space and weight limitations normally make it impractical to provide a gondola of standard design with sufficient vertical and horizontal space for the passenger to assume either of two selective upright and reclining positions.

It is accordingly one object of the present invention to provide an improved gondola assembly for high altitude manner balloon flights.

Another object is a gondola of minimum weight and volume for a human passenger, in which the gondola can be moved to different angular positions.

A still further object is a gondola construction which includes means automatically altering the position of the gondola beneath its lifting cell in response to changes in position of the passenger.

Other objects and advantages of the present invention will be apparent from the following specification in which certain preferred embodiments of the invention are described with particular reference to the accompanying drawings.

In the drawings, wherein like reference characters indicate like parts:

Figure 1 is a perspective view of a complete balloon assembly including a gondola according to the present invention;

Fig. 2 is an enlarged side view of the gondola assembly of Fig. 1, with the parts in position to hold a passenger in an upright sitting position;

Fig. 3 is a view of the gondola portion of Fig. 2 with certain portions broken away to show details of the interior construction;

Fig. 4 is a partial perspective view of a section of the fabric which forms the gondola body;

Fig. 7 is a view similar to Fig. 3 showing the parts in position to hold a passenger in reclining position; and Fig. 8 is a view similar to Fig. 2 showing the more horizontal position automatically assumed by the gondola when the passenger is in the position of Fig. 7.

The gondola assembly of the present invention is used with a balloon or lifting cell of known construction as shown in Fig. 1. Here the lifting cell is designated generally at 10. Its upper end is closed or capped at 12 and its lower end is secured at 14 to a suitable end fitting which provides a load attachment shaft 16. A loop or ring 18 (Fig. 2) at the lower end of this load attachment shaft 16 provides means for attachment of the upper ends of a plurality of suspension lines indicated generally at 20. The construction and arrangement of these suspension lines is described in detail below.

The gondola construction used to illustrate this invention is one in which the two primary functions of the gondola are separated, so that the load bearing and support function can be carried out by the use of rigid members which need serve no other purpose. Similarly the shell construction can be made of suitable materials and assembled in a fashion to provide only the protective function of a pressurized chamber with no supporting effect. In this manner an extremely light and efficient gondola construction can be achieved without loss of essential safety or protection for the operator. Certain features of the illustrated gondola construction are shown and claimed in the copending application of Richard Schwoebel, filed of even date herewith, Serial No. 578,528, for "Balloon and Gondola Assembly," and in the copending joint application of Froehlich and Schwoebel, Serial No. 578,529, also filed of even date herewith, for "Gondola Assembly."

Figure 5:
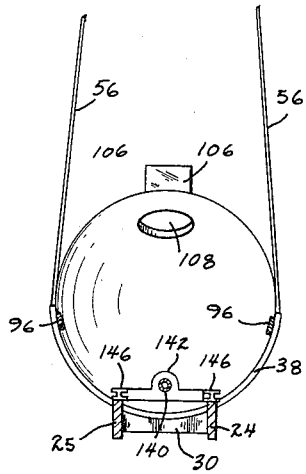
Fig. 5 is a sectional view on the line 5—5 of Fig. 3.

As shown in Figs. 2 and 3, and more fully described in said copending applications, the load-bearing and passenger-supporting portion of the gondola includes one or more rigid body or keel members 24, 25. The keel members include integral curved end portions 28 adapted to extend around the lower end of the gondola body as shown. The gondola is inclined at an angle as shown in Fig. 2, to provide a minimum volume within which the passenger may sit. The keel members 24 and 25 extend longitudinally beneath the main body portion and lower end portion of the gondola to provide means for supporting the desired passenger and equipment inside the gondola and also to protect the lower portions of the gondola during takeoffs and landing. As shown in Fig. 5, the two keel members 24 and 25 may be rigidly connected by appropriate cross members 30 or by other means such as the internal supporting mechanism within the gondola.

To connect the body or keel members to the suspension lines 20, a plurality of ribs or load attachment members 32, 34, 36, and 38 are provided. These attachment members are located at points which are spaced horizontally or laterally from each other in both positions of the gondola. Thus the total weight of the gondola assembly can be distributed and carried over a plurality of regions along the length of the gondola.

The suspension lines indicated generally at 20 include a plurality of pairs of lines shown specifically at 50, 52, 54, and 56. These pairs are respectively associated with the rib members 32, 34, 36 and 38 at one end and with the load ring 18 of the lifting cell at the upper end. To maintain the suspension lines in association with the rib members, these latter members are formed of channel construction with outwardly projecting edges 58 as shown. The upper ends of these ribs and their corresponding channel edges 58 are flared outwardly at 60 to accommodate the differences in angular orientation of the gondola in the respective positions of Figs. 2 and 8.

The present invention provides means for adjustment of the gondola position, and specifically for automatic adjustment of its angular orientation in response to changes in the position of the passenger. For example, the gondola assembly includes means for automatically changing the length of the suspension lines in response to changes in the relative location of the passenger or load within the gondola. The preferred means for accomplishing this purpose is the provision of at least one pair of suspension lines 56 which is resiliently extensible. In practice, I have found that the desired results can be achieved by making one or more, and preferably each of the pairs of suspension lines from synthetic linear polyamide resin materials of the type known as "nylon." The nylon is preferably used in the form of nylon webbing and this material combines very high load-bearing characteristics with a high degree of resilient extensibility. By the use of resiliently extensible suspension lines of this type, I have made it possible to change the relative orientation of the gondola in a vertical plane in automatic response to changes in the location of the center of gravity of the load with reference to the points of attachment of the suspension lines. Thus a gondola of minimum volume can support a passenger in two selective positions, as explained below, with maximum comfort in each of such positions.

The invention further contemplates the provision of suitable passenger or pilot supporting means indicated generally at 62. The supporting means includes a seat member 64, and may include a back rest or member 66 as shown in Fig. 3, and in greater detail in Fig. 6. The seat and back members are carried on a suitable cross shaft 68 and their relative location and positions may be adjusted as described below.

As shown in Fig. 3, the gondola assembly also includes suitable instruments indicated at 76. A flexible cable 78 provides a connection for a portable indicating or control unit 80 which the passenger may carry in his hand (as in Fig. 3) for convenience in reading or controlling the various instruments. Unit 80 may also be supported in a bracket 85 on the deck, as shown in Fig. 7, when it is not needed for direct operation.

The gondola assembly also includes a ballast unit indicated at 82. For convenience this ballast unit is secured at points 83 between the keel members 24 and 25. The assembly includes means for changing or adjusting the relative position of this ballast unit to achieve the desired weight distribution along the keel members and thus assist in establishing the desired angular orientation of the gondola in a vertical plane. For this purpose the keel members include additional attachment points or openings 86 for location of the ballast unit 82 selectively at a plurality of positions along the keel. The ballast unit includes suitable connections 84 with an internal operating member which can be controlled by the passenger through unit 80 to release ballast as desired during the flight.

In high altitude balloon flights it is also essential to protect the passenger from adverse atmospheric and other conditions by some sort of enclosing shell. This shell construction, which is more fully described in said copending applications, is indicated generally at 88 and includes a cylindrical body portion 90 with integral hemispherical upper and lower end portions 92 and 94. Other shapes may of course be used in appropriate cases, but this particular shape offers definite advantages and convenience in construction and in the provision of optimum ratios of surface area and volume to provide a gastight insulated chamber just large enough for the desired passenger and instrument load.

The shell in this case is made of light flexible fabric material. The flexible material of the shell is secured to the rigid body and keel members in any known gastight manner. As shown in Fig. 5, the fabric shell portion is secured to the upper surfaces of the keel members 24 and 25 and to the inner surfaces of ribs 32, 34, 36, and 38, as indicated at 96 in Fig. 5.

As illustrated in Fig. 4, the shell is made of nylon fabric material provided with certain additional layers or coatings. Here the fabric layer 98 is associated with an outer aluminum foil layer 100 and an inner aluminum foil layer 102, for better temperature control within the shell.

The nylon fabric 98 is associated with a suitable layer of lining material such as that shown at 104. Plastic resin materials of the polyethylene type are particularly suitable for the construction of such liners.

The shell includes suitable ports 106, 108, through which the operator can observe the external conditions during flight. The fabric shell also includes convenient access and escape means in the form of a removable panel 110 connected by a gasproof zipper construction 112 to the remainder of the body portion. To maintain the shell in its fully expanded shape, its interior is pressurized by any suitable gas. The gas, such as compressed air, may be supplied from a pressure cylinder 118 conveniently located under seat 64 for control by the passenger.

Figure 6:
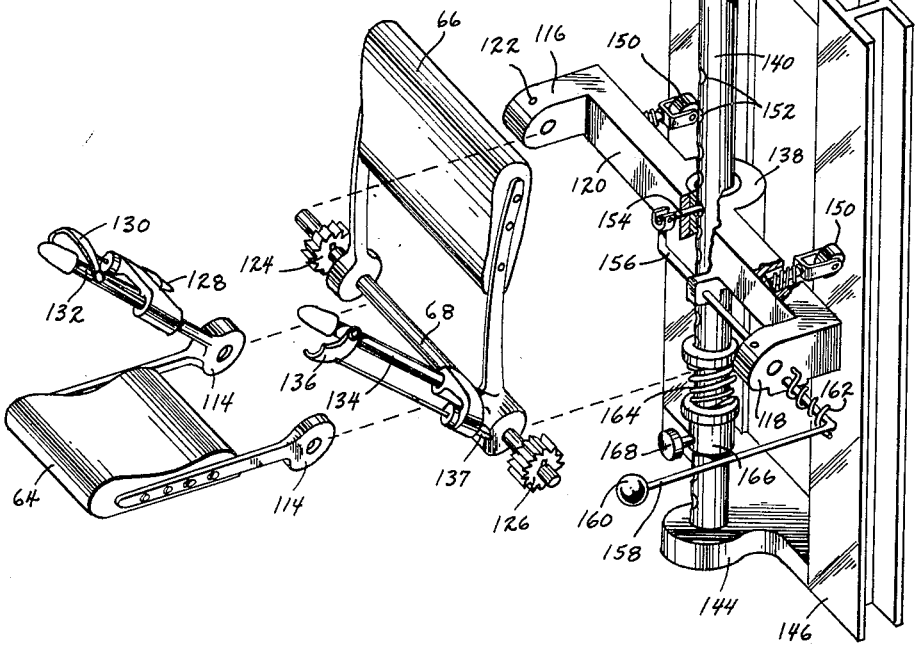
Fig. 6 is an exploded perspective view, in brackets, of the passenger-supporting mechanism and its various adjustments.

According to the invention, the gondola assembly includes means for adjustment of the position and relative location of the passenger with respect to the attachment means for the suspension lines. The various adjustments are shown in Figs. 3, 6, and 7. The seat member 64 includes portions 114 rotatably supported by the cross shaft 68. Shaft 68, in turn, is rigidly positioned laterally of the gondola and keel members by brackets 116 and 118 on a cross member 120. The shaft 68 is rigidly keyed in position at 122 to prevent its rotation.

Suitable ratchet gears 124 and 126 are in turn keyed to the shaft 68 and are thus held against rotation. The locking pawl 128, operated by the lever 130 on an operating handle 132, is adapted for cooperation with the fixed ratchet gear 124. Operating handle 132, in turn, is rigidly connected to seat member 64 for convenient adjustment of the angular orientation of the seat. The described construction provides means for locking the seat 64 at any desired angular position with respect to shaft 68, through engagement and disengagement of pawl 128 with gear 124.

The back member 66 is similarly mounted for rotation on shaft 68 and includes an operating handle 134 for convenient change in its angular orientation. The release lever 136 on the operating handle 134 controls the position of a locking pawl 137 which in turn cooperates with the fixed gear 126. Thus the angular position of the back member 66 can be readily controlled.

According to a further feature of the invention, means are provided for longitudinal adjustment of the position of the seat and back members as a unit along the keel member. For this purpose, the cross member 120 has a central bearing portion 138 which is longitudinally slideable on a fixed rod or shaft 140. This shaft or support 140 is carried by cross members 142 and 144 secured to inner frame members 146 and 148. These inner frame members are adapted for engagement with the keel members in rigid load-bearing relationship.

If desired, guides or rollers 115 may be carried by cross member 120 to engage the members 146 and 148 and facilitate longitudinal adjustment of the seat assembly. To retain the assembly in any one of a plurality of selective positions, the supporting shaft 140 is provided with longitudinally spaced openings or locking notches 152. A locking pin 154 slides in the cross member 120 for engagement and disengagement with openings 152. A rock shaft 156 has a lever arm connected to the locking pin 154 to control its position. An operating lever 158 and handle 160 permit the passenger to withdraw or engage the locking pin 154 and thus adjust the location of the seat assembly. A spring 162 normally urges the locking pin 154 into its locking position.

A suitable supporting or cushioning spring member 164 may also be provided on the support shaft 140 to assist in carrying part of the weight of the seat assembly. This relieves the locking pin 154 of the total weight, when the assembly is in vertical position. Spring 164, in turn, is supported at its lower end by a stop collar 166 which may be adjustably positioned along the shaft 140 by means of a locking pin 168 engaging openings 152.

The collar 166 will initially be positioned at a point which supports the seat assembly at a convenient height to hold the operator in a sitting position as shown in Fig.

3. The operator's feet then rest on a horizontally disposed platform portion 170 and the seat and back members 64 and 66 are angularly oriented to hold the passenger upright. In this case, the effective center of gravity of the passenger is so located with respect to the points of attachment of the suspension lines that the gondola will be oriented at only a small angle (e. g. less than 45 degrees) with the vertical. This angle may be as little as 30°. In this position the operator is comfortably supported for observation of external conditions and for control of the appropriate instruments, ballast units, and other items. Viewing window 106 is specifically located at an area through which the operator can look in a generally horizontal direction when the gondola and passenger are in this position of Fig. 3.

Because high altitude flights may extend over a substantial period of time, the invention permits a change in relative position of the supporting means so that the operator can rest in a reclining posiiton. For this purpose, the seat and back members are adjusted to the position shown in Fig. 7. Here the operator may extend his feet to the angularly oriented portions 172 and 174 of the lower platform. These portions are oriented so that the lower legs of the operator can be supported in a substantially horizontal position. As the operator extends his body into the reclining position, he may find it desirable to slide the seat assembly upwardly and lock it in a new adjusted position.

In any event, the change in his effective center of gravity, whether by the angular tilting of the seat portions alone, or by readjustment of the operator's position longitudinally of the keel, is designed to produce a net change in the effective location of the center of gravity with respect to the suspension lines. Because of the resilience of these lines, the gondola will automatically tilt to the more horizontal position of Figs. 7 and 8. In this specific example, the longitudinal axis of the gondola is tilted substantially 60 degrees from the vertical. The degree of tilt can of course be controlled by adjustment of the relative position of the parts.

For the operator's convenience in this reclining position, a head rest 176 is also provided on an extension 178 of the internal framing member and keel construction. In this position, viewing window 108 is specifically located at an area through which the operator can look vertically upward to observe the condition of the balloon from which he is suspended.

The gondola assembly just described substantially accomplishes the objectives set forth at the beginning of this application and provides a method of supporting a passenger in safety and comfort for high altitude flights, in either of two selective positions, one upright and one reclining. The possibility of adjustment of the gondola orientation to provide such positions facilitates the use of a gondola of minimum size, volume and weight. The preferred form of the invention also makes possible the automatic adjustment of this gondola position in response to changes in passenger position. Since many variations and changes in the exact details of construction will be apparent to persons skilled in this field, it is intended that this invention shall cover all such changes and modifications as fall within the spirit and scope of the attached claims.

Now, therefore, I claim:

1. A balloon gondola assembly for high altitude manned flight comprising a rigid body member having first means for supporting a passenger thereon in selective positions, means on said gondola for attaching said body member to a lifting cell, said means for attaching including a plurality of suspension lines attached at spaced points to said gondola, at least some of said lines being resilient for changing the angular orientation between said body member and cell in a vertical plane in response to movement of a passenger between selective positions.

2. The balloon gondola assembly according to claim 1 wherein said resilient suspension lines have their lower ends connected to the body member at four regions spaced along the length of said body and with the upper ends of said lines connected at substantially a common point for attachment to the lifting cell.

3. A balloon gondola for high altitude manned flight comprising a rigid keel member, a plurality of resilient attachment means located at horizontally spaced points along said keel member for attaching said keel to a lifting cell, passenger support means on said gondola connected to said keel for carrying a passenger at a desired location along said keel, means for adjusting the relative location of said passenger support means with respect to said points, said support means being movable between a first position in which it is adapted to support the passenger in sitting position and a second position in which it is adapted to support the passenger in reclining position, and in which the relative location of said first and second position with respect to said resilient attachment means tilts the keel member and support means toward a more horizontal position in response to movement of the support from first to second position and tilts said keel and support toward a more upright position in response to movement of the support from second to first position.

4. A balloon gondola assembly according to claim 1 having a ballast unit supported thereon and means at a plurality of selective positions spaced along said body member for adjustably supporting said ballast unit.

5. A balloon gondola assembly according to claim 1 having a first viewing window in said body member located at an area through which the passenger can look vertically up to see the lifting cell when said body member is angularly oriented according to one of said passenger positions, and a second viewing window located at an area through which the passenger can look generally horizontally when said body member is angularly oriented in response to the other of said passenger positions.

References Cited in the file of this patent

UNITED STATES PATENTS

| | | |
|---|---|---|
| 43,449 | Andrews | July 5, 1864 |
| 2,452,228 | Dawes et al. | Oct. 26, 1948 |

FOREIGN PATENTS

| | | |
|---|---|---|
| 131,655 | Great Britain | Sept. 4, 1919 |
| 258,782 | Germany | Dec. 7, 1924 |
| 740,158 | Great Britain | Nov. 9, 1955 |